United States Patent
Kemmler et al.

(10) Patent No.: US 10,429,239 B2
(45) Date of Patent: Oct. 1, 2019

(54) COLOR CAPTURE ARRANGEMENT AND CORRECTION METHOD USING THE COLOR CAPTURE ARRANGEMENT

(71) Applicant: SensoPart Industriesensorik GmbH, Wieden (DE)

(72) Inventors: Manfred Kemmler, Voerstetten (DE); Robert Weiss, Freiburg (DE); Dirk Trueper, Schoenbourg (FR)

(73) Assignee: SensoPart Industriesensorik GmbH, Wieden (DE)

(*) Notice: Subject to any disclaimer, the term of this patent is extended or adjusted under 35 U.S.C. 154(b) by 13 days.

(21) Appl. No.: 15/921,405

(22) Filed: Mar. 14, 2018

(65) Prior Publication Data

US 2018/0299325 A1    Oct. 18, 2018

(30) Foreign Application Priority Data

Apr. 18, 2017  (DE) .................. 10 2017 003 703

(51) Int. Cl.
| | |
|---|---|
| *G01N 21/25* | (2006.01) |
| *G01J 3/02* | (2006.01) |
| *G01J 3/51* | (2006.01) |
| *G01J 3/28* | (2006.01) |
| *G01J 3/50* | (2006.01) |

(52) U.S. Cl.
CPC ........... *G01J 3/0297* (2013.01); *G01J 3/0216* (2013.01); *G01J 3/0218* (2013.01); *G01J 3/0229* (2013.01); *G01J 3/0289* (2013.01); *G01J 3/2803* (2013.01); *G01J 3/50* (2013.01); *G01J 3/51* (2013.01); *G01J 2003/507* (2013.01)

(58) Field of Classification Search
CPC ...... G01J 3/0297; G01J 3/0216; G01J 3/2803; G01J 3/50; G01J 3/51; G01J 2003/507; G01N 21/25; G01N 21/57
See application file for complete search history.

(56) References Cited

U.S. PATENT DOCUMENTS

2004/0109170 A1* 6/2004 Schick ................ G01B 11/026
356/614

* cited by examiner

*Primary Examiner* — Abdullahi Nur
(74) *Attorney, Agent, or Firm* — Slater Matsil, LLP

(57) ABSTRACT

A color capture arrangement and a method for correcting a captured brightness of an object are disclosed. In an embodiment the color capture arrangement includes a directed light source configured to direct light towards the object to be identified, evaluation electronics and a color capture device including at least three color identification sensors configured to receiving radiation reflected by the object and funnels as light-guiding elements, wherein each funnel is disposed upstream of a color identification sensor, and wherein at least one of the color identification sensors is a distance sensor.

11 Claims, 2 Drawing Sheets

COLOR CAPTURE ARRANGEMENT AND CORRECTION METHOD USING THE COLOR CAPTURE ARRANGEMENT

CROSS-REFERENCE TO RELATED APPLICATIONS

This application claims the benefit of German patent application 10 2017 003 703.5, filed on Apr. 18, 2017, which application is hereby incorporated herein by reference.

TECHNICAL FIELD

The invention relates to a color capture arrangement for determining at least one color of an object and a correction method for correcting a captured brightness of the object using the color capture arrangement.

BACKGROUND

The prior art has disclosed color measuring devices that can be used to test colors of produced goods, for example. The sensor systems of these measuring devices determine, inter alia, the color components of the received light. In order to identify a color, or to re-identify it, it is necessary to also determine the brightness in addition to the color components (RGB). Here, the measured brightness depends on the distance of the colored object from the sensor, whereby different brightnesses can be measured for different distances. Thus, for example, a brown hue may differ from yellow hues only in the brightness but not in terms of the color components.

However, since the measured brightness depends strongly on the distance of the object, the re-identification is only possible over a small distance range. Consequently, the capture is too inaccurate over a larger distance range. In addition to the color identification sensor, use could be made of a specific distance-measuring device in order to correct the measured brightness with the known dependence on the distance. However, this method is complicated and the required color measuring devices are expensive.

SUMMARY

Embodiments of the invention provide a color capture arrangement for determining a color of an object. The arrangement may have a simple structure and may be cost-effective.

Further embodiments provide a method for identifying the brightness and hence the color of an object independently of a distance range, and a method for improving the color identification by way of a color capture arrangement.

Embodiments provide a color capture arrangement that serves to determine one or more colors of an object. The arrangement may include a directed light source, which is directed onto the object to be identified, evaluation electronics, and a color capture device with three or more color identification sensors for recording radiation that is reflected by the object. According to embodiments of the invention, a funnel as a light-guiding element is disposed upstream of each color sensor. Further, at least two of the color identification sensors are used as a distance sensor.

For example, the distance can be determined by the arrangement by way of two funnels of an already available 4×3 funnel matrix, wherein the distance signal can be used to compensate the brightness signal (received energy per color channel). For normalization purposes, use can be made of the total received energy, for example.

In various embodiments, the color identification sensors form a unit with the funnels and they are arranged as a sensor matrix with four columns and three rows. According to embodiments of the invention, two of the color identification sensors can be used as distance sensors. To this end, one column of the sensor matrix may be provided for the distance measurement; by way of example, this is the first column in an embodiment of the color capture device. Further, an upper, first funnel and a lower, second funnel may be present in the column. The light beams that are received by these two funnels and reflected by the object are guided onto the color identification sensors that are used as distance sensors. Here, the intensities of the light beams recorded by the two funnels have a different dependence on the distance of the object on account of the different arrangement. The different distances to the object, the transmitter is imminent here, the column orientation of the funnels is arbitrary in this case and not fixed. In an embodiment, the upper funnel and the lower funnel can be used in the case of a column with three rows—the central one of the three funnels not being used or not having an assigned sensor.

Further embodiments can provide for each funnel to have a pyramidal frustum form, wherein the exit face corresponds to a top face and an entry face of the funnel corresponds to a base of the pyramidal frustum. The pyramidal frustum preferably has a quadratic base. Alternatively, the base may also be triangular or polygonal with more than four corners. These geometric forms produce a light concentration and do not have a lens effect. In the case of non-segmented receivers, a conical form as a basic form may also find use in certain individual arrangements, with the base and top face being circular in each case. For the purposes of explaining the functionality of the funnels, reference is made to German Patent DE 100 16 349 B4 which is incorporated herein by reference in its entirety.

Advantageously, each funnel as a light-guiding element can be without lenses such that the radiation or the light incident in each funnel is reflected at most n times, with n≤2. Here, each funnel serves as a non-imaging concentrator in front of each color identification sensor.

Provision can also be made for the funnels to comprise or consist of a light-transmissive solid material, preferably glass or synthetic quartz glass. Alternatively, use can be made of a polymer such as acrylic glass (polymethyl methacrylate) or else polycarbonate. Other transparent polymers such as polyether imide or polysulfone may also be considered. Here, on account of the low volume, a single funnel can be produced in a simple and cost-effective manner, for example, by way of the injection molding method.

Yet further embodiments can provide for each color identification sensor to have one or more monochrome color recording areas, when the color recording area may be RGB sensitive, i.e., red, green or blue sensitive in particular. Alternatively, the color recording areas may also be CMY sensitive, in particular cyan, magenta, yellow sensitive. Thus, different color standards can be used in the color capture device. Here, in an embodiment of the invention, the color recording areas of the color identification sensor can be photodiodes which have a color filter arranged upstream thereof. Other sensor types which realize individual, monochrome color recording areas may also find use in embodiments of the invention. The color identification may also be effectuated by means of three filtered photodiodes. It is also possible to use more than three photodiodes in order to obtain better and more signals, wherein there can also be a type of doubling up.

According to various embodiments, in order to optimize the distance characteristic or increase the different intensity dependence on the distance, use can be made of a gray graduated filter which amplifies the distance-specific different shadowing of the close range and far range measurement diodes. To this end, the color identification sensors provided for the distance measurement can be the gray graduated filter in one embodiment of the color capture arrangement. Here, the gray graduated filter can be arranged in such a way that it covers a lower portion (a lower third, for example) of the upper, first color funnel and, at the same time, an upper portion (an upper third, for example) of the second, lower color funnel. In a further embodiment of the invention, the gray graduated filter can have different forms, for example, a graduated gradient, a stripe pattern, a zigzag pattern or else a grid of points with variable distances. Further options include, for example, graduated filters with a variable transmission or the use of a print with suitable geometries for partial shadowing of the near range or far range sensors. In one embodiment, the gray graduated filter is arranged at the light entry face, i.e., upstream of the funnel.

The color capture arrangement can be designed in such a way that it can be flexibly adapted to the respective requirements. Thus, in addition to color-sensitive photodiodes as color identification sensors, it is also possible to use conventional photo receivers and provide these with a color filter. All funnels concentrate the light in the same way onto the color recording area and facilitate the same shadowing behavior for all color recording areas. The noise behavior of these individual color sensors is less than or equal to the noise behavior of a color capture device overall on account of the smaller reception area.

In order to be able to exactly record colors of objects or color-characteristic properties or parameters, embodiments can provide for the light source to emit white light. Here, the light source may be a laser arrangement made of respectively one blue, red and green laser, or else an LED, LED arrangement or any other directed light source.

Embodiments of the invention also provide a correction method for correcting a captured brightness of the object using a color capture arrangement according to embodiments of the invention. The method may be carried out as follows: the object is irradiated with light beams from the light source, wherein the light beams are incident on one or more position(s) of the object in relation to the light source; here, the object may have different distances from the color capture arrangement; the brightness at the position of the object is determined by capturing the intensity of the light beams, reflected by the object, using the color identification sensors and transmitting the information items of the three color components and the two receiver intensities A1 A2, serving for the distance measurement, to the evaluation electronics; the difference signal ΔA of the signals A1 and A2 is formed and normalized using the total received energy of the distance sensors using the evaluation electronics and a correction factor for the brightness is determined; and, finally, the brightness is determined using the correction factor from the normalized difference signal.

The term distance signal may mean the signal which is measured by means of the color identification sensors that are used for the distance measurement. By way of example, as a reception unit, the color capture device has a 4×3 matrix made of color identification sensors or color receivers with just as many funnels disposed upstream thereof. A 3×3 submatrix is equipped with nine color receivers in the process (3×R, 3×G, 3×B). It is now possible, in the remaining 1×3 matrix, to use the funnels at the edge (near to the transmitter and far from the transmitter) in order to produce the distance-dependent difference signal. Here, near and far means the lateral distance at the exit face of the sensor arrangement—a different distance dependence of the measured intensity is obtained as a result of this different distance. Advantageously, color identification sensors are used to determine the distance to the object and this measurement value is used to correct the received brightness. In principle, the distance is ascertained from the difference signal of two photodiodes:

$$\Delta A' = A1 - A2.$$

In various embodiments, as a result of different distances from the object to be measured being present on account of different positions on the object itself, the two funnels have a different field of view; consequently, the received light intensity changes if the distance is changed, in a manner analogous to the distance measurement by way of triangulation. Since the difference of the two signals changes linearly with the object brightness, the difference signal must be normalized by the total received energy of the distance sensors:

$$\Delta A_{tot} = \Delta A'/(A1+A2).$$

This functional principle may correspond to the known triangulation distance measurement by means of a difference diode.

In further embodiments, in order to easily determine the correction value, the method can provide for the normalized difference signal to be compared to a data record or a plurality of predetermined data records. From this, it is then possible to ascertain the correction factor, wherein the received energy per color channel is ascertained from the signal and compared to predetermined data records such as a suitable lookup table, for example.

In particular, this is advantageous in that the brightness of the object or of a certain point on the object can be determined over a large distance range. As a result, a color of an object can be captured and correctly determined in a very simple and effective manner.

A further embodiment of the arrangement can provide for the difference signal to be produced in analog fashion and for an A/D converter to be used to convert the analog signal into a digital signal. Alternatively, provision can be made for analog signals to be captured by means of the distance sensors and the analog signals to be converted into digital signals by means of the A/D converter. An associated data processing unit, such as a microcontroller or the like, may be assigned to the arrangement, be a part thereof or be connected thereto. Hence, it is possible to evaluate the data of the digitized signals in a fast and simple manner.

BRIEF DESCRIPTION OF THE DRAWINGS

Further embodiments of the arrangement and of the method, and some of the advantages connected to these and further embodiments, will become clear and more easily understandable by way of the following detailed description with reference to the attached figures. The figures are only a schematic illustration of one embodiment of the invention.

In the figures.

DETAILED DESCRIPTION OF ILLUSTRATIVE EMBODIMENTS

Figure 1:
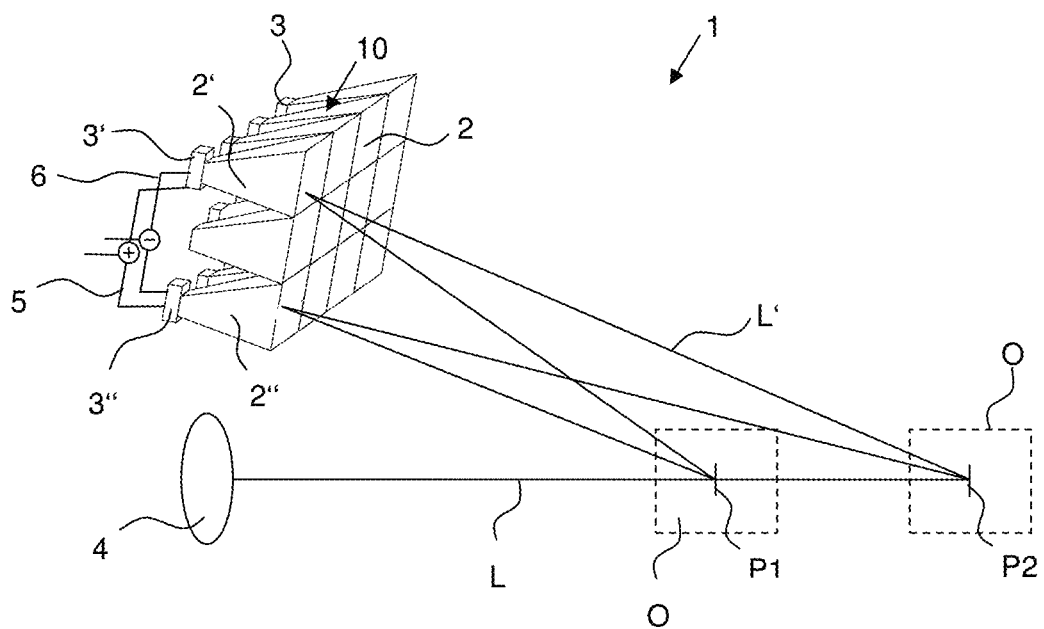
FIG. 1 shows a schematic view of the color capture arrangement.

In FIG. 1, a color capture arrangement 1 is constructed from a color capture device 10, an object O to be measured and a light source 4. Light beams L from the light source 4 are incident on the object O, which may be present at various positions P1 and P2, and are cast back as reflected light beams L'. The reflected light beams L' are captured by the color capture device 10.

The color capture device 10 has a multiplicity of sensors 3, for which light-guiding elements in the form of funnels 2 are arranged in the light path. By way of the funnels 2, the reflected light beams L' are steered onto the sensor area of the color identification sensors 3 in a targeted manner. The color identification sensors 3 are arranged in a 4×3 matrix, with not all columns of the matrix being used for the color identification. According to embodiments of the invention, the left column of the matrix (in FIG. 2) is used for distance measurements. Here, the column has an upper, first distance sensor 3' and a lower, second distance sensor 3". The central funnel is not used. Likewise, one funnel 2', 2" is assigned to these sensors in each case. Thus, the first distance sensor 3' serves as a "far sensor" and the second distance sensor 3" serves as a "near sensor". The color identification sensors used as distance sensors 3', 3" in this case thus measure the distances of the object face to the positions P1, P2 of the object O together, for example, and so the object O is present once at the position P1 and once at the position P2.

External electronics 5 are disposed downstream of the color identification sensors 3 and the distance sensors 3', 3". Said electronics are a constituent part of the color capture device 10 according to FIG. 1, but may also be arranged at a distance therefrom. FIG. 1 shows a variant in which the measured raw signals of the distance sensors 3', 3" can be directly subtracted from or added to one another, as indicated by an electrical line connection 6. The color identification sensors 3 used for color capture are combined in a 3×3 color matrix 8, as is framed in a front view in FIG. 3. Here, the color matrix 8 is equipped with nine color receivers, with three being allotted to the color red, three to green and three to blue; here, the distribution is as desired or adapted to the respective measurement situation.

Figure 2:
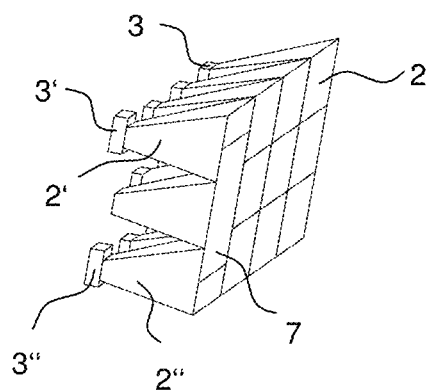
FIG. 2 shows a schematic perspective view of the color capture device with a gray graduated filter.
Figure 3:
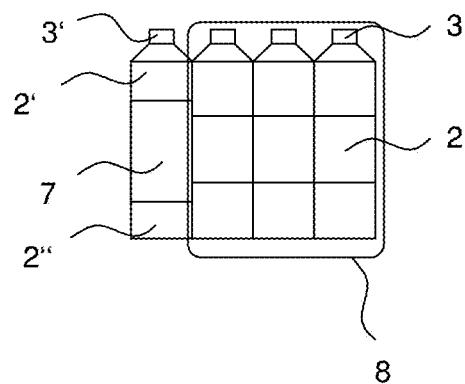
FIG. 3 shows a schematic front view of the color capture device with a gray graduated filter.

In order to further improve the distance characteristic, which is captured according to FIG. 1, FIGS. 2 and 3 show that a gray graduated filter 7 is assigned to the funnels 2', 2", which are assigned to the distance sensors 3', 3", said gray graduated filter amplifying the distance-specific different switch-offs of the near and far sensors 3' 3". According to FIG. 2, the gray graduated filter 7 is arranged in such a way that it covers a lower region of the first funnel 2' and an upper portion of the second funnel 2".

Figure 4:
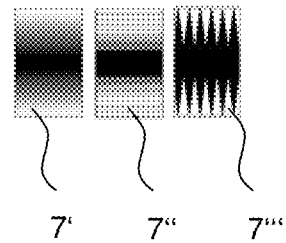
FIG. 4 shows schematic views of various gray graduated filters.

FIG. 4 shows different types of gray graduated filters 7', 7", 7'", in this case a gradient filter 7', a stripe pattern (filter 7") and a zigzag pattern (filter 7'"). A grid with points with variable distances is also possible.

Figure 5:
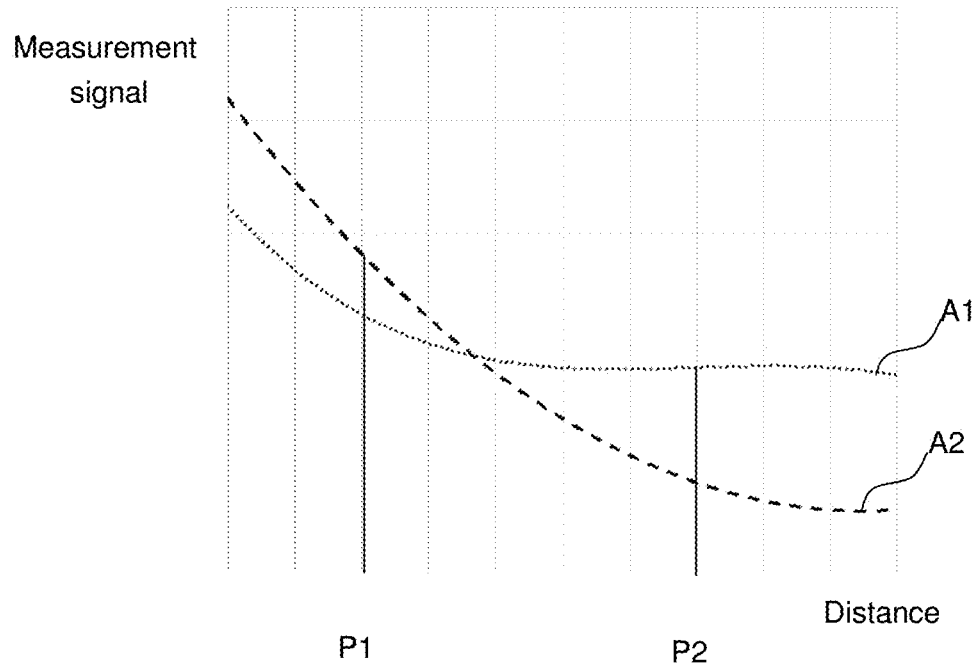
FIG. 5 shows a schematic diagram of measured signals, plotted over the sensor-object distance.

The effect of the gray graduated filter 7 is illustrated in FIG. 5, where a measurement signal is plotted over the "sensor-object" distance in an exemplary manner. At the positions P1 and P2, the distance signal is marked in each case, once without a gray graduated filter 7 (dotted curve S1) and once with a gray graduated filter 7 (dashed curve S2). It is clear that an increase in the measurement signal and hence also an improved measurement can be obtained with filtering, since a greater difference of the two signals and hence a higher resolution is achieved.

LIST OF REFERENCE SIGNS

1 Color capture arrangement
2 Funnel
2', 2" Funnels of distance sensors
3 Color identification sensors
3', 3" Distance sensors
4 Light source
5 Evaluation electronics
6 Electrical line connection
7 Gray graduated filter
8 Sensor matrix
10 Color capture device
L Light beams
L' Reflected light beams
O Object
S1 Distance signal without filter
S2 Distance signal with filter

What is claimed is:

1. A color capture arrangement for determining at least one color of an object to be identified, the color capture arrangement comprising:
   a directed light source configured to direct light towards the object;
   evaluation electronics; and
   a color capture device comprising:
      at least three color identification sensors configured to receiving radiation reflected by the object; and
      funnels as light-guiding elements,
   wherein each funnel is disposed upstream of a color identification sensor, and
   wherein at least one of the color identification sensors is a distance sensor.

2. The arrangement as claimed in claim 1,
   wherein the color identification sensors and the funnels form a sensor matrix with four columns and three rows,
   wherein two of the color identification sensors are distance sensors,
   wherein a column of the sensor matrix is configured to perform a distance measurement,
   wherein an upper funnel and a lower funnel are present in the column such that they guide light beams reflected by the object and received by the two funnels on the distance sensors.

3. The arrangement as claimed in claim 1,
   wherein each funnel has an inverted pyramidal frustum form, a light entry face and, opposite thereto, a light exit face,
   wherein the light entry face is larger than the light exit face.

4. The arrangement as claimed in claim 1, wherein the funnels are without lenses.

5. The arrangement as claimed in claim 1,
   wherein the color capture device has at least one gray graduated filter, and
   wherein the gray graduated filter is disposed upstream of two of the color identification sensors, and
   wherein the two color identification sensors are distance sensors.

6. The arrangement as claimed in claim 5,
wherein the gray graduated filter is arranged such that it covers a lower portion of an upper, first funnel and an upper portion of a second, lower funnel.

7. The arrangement as claimed in claim 1,
wherein each color identification sensor has at least two different monochrome color recording areas, and
wherein one color recording area is red RGB sensitive and the other color recording area is CMY sensitive.

8. A method for correcting a captured brightness of an object using a color capture arrangement according to claim 1, the method comprising:
irradiating the object with light beams from the light source, wherein the light beams are incident on at least one position of the object in relation to the light source;
determining the brightness at the position by capturing intensities A1 and A2 of the light beams, reflected by the position of the object using the color identification sensors as distance sensors;
transmitting intensity information for the intensities A1 and A2 to the evaluation electronics;
forming a difference signal based on the intensity information;
performing a normalization of the difference signal using a total received energy of the distance sensors;
determining a correction factor for the brightness; and
correcting the determined brightness by the correction factor from the normalized difference signal.

9. The method as claimed in claim 8, further comprising:
comparing the normalized difference signal to at least one data record and ascertaining the correction factor therefrom;
ascertaining a received energy per color channel from the normalized difference signal; and
performing a comparison with predetermined data records.

10. The method as claimed in claim 8, further comprising:
producing an analog difference signal and an analog sum signal;
converting the analog signals into digital signals by an A/D converter; and
determining the normalized difference signal from the digitized signals in the evaluation electronics.

11. The method as claimed in claim 8, further comprising:
capturing analog signals by the distance sensors;
converting the analog signals into digital signals by an A/D converter; and
determining the normalized difference signal from the digitized signals in the evaluation electronics.

* * * * *